(12) United States Patent
Li et al.

(10) Patent No.: US 9,005,345 B2
(45) Date of Patent: Apr. 14, 2015

(54) NANO-CHANNEL ENHANCED COMPOSITE MEMBRANES

(71) Applicants: Shiguang Li, Mount Prospect, IL (US); Shaojun Zhou, Palatine, IL (US); Miao Yu, Pittsford, NY (US); Moises A Carreon, Louisville, KY (US)

(72) Inventors: Shiguang Li, Mount Prospect, IL (US); Shaojun Zhou, Palatine, IL (US); Miao Yu, Pittsford, NY (US); Moises A Carreon, Louisville, KY (US)

(73) Assignee: Gas Technology Limited, Des Plaines, IL (US)

( * ) Notice: Subject to any disclaimer, the term of this patent is extended or adjusted under 35 U.S.C. 154(b) by 200 days.

(21) Appl. No.: 13/622,434

(22) Filed: Sep. 19, 2012

(65) Prior Publication Data

US 2014/0076161 A1    Mar. 20, 2014

(51) Int. Cl.
*B01D 53/22* (2006.01)
*B01D 69/14* (2006.01)
*B01D 71/02* (2006.01)
*B82Y 30/00* (2011.01)

(52) U.S. Cl.
CPC ............ *B01D 53/22* (2013.01); *B01D 53/228* (2013.01); *B01D 69/148* (2013.01); *B01D 71/028* (2013.01); *B01D 2257/504* (2013.01); *B01D 2258/0283* (2013.01); *B01D 2325/04* (2013.01); *B82Y 30/00* (2013.01); *Y02C 10/10* (2013.01); *Y10S 977/778* (2013.01)

(58) Field of Classification Search
CPC ...... B01D 53/22; B01D 53/228; B01D 71/16; B01D 71/56; B01D 71/64; B01D 71/68; B01D 71/70; B82Y 30/00

USPC .......................... 95/51; 96/4, 11, 12; 977/778
See application file for complete search history.

(56) References Cited

U.S. PATENT DOCUMENTS

| | | | |
|---|---|---|---|
| 6,503,295 B1 * | 1/2003 | Koros et al. | 96/11 |
| 7,510,595 B2 * | 3/2009 | Freeman et al. | 96/11 |
| 2005/0139066 A1 * | 6/2005 | Miller et al. | 96/4 |
| 2006/0230926 A1 * | 10/2006 | Fritsch et al. | 95/45 |
| 2008/0216650 A1 | 9/2008 | Falconer et al. | |
| 2009/0120875 A1 * | 5/2009 | Liu et al. | 95/45 |
| 2012/0048109 A1 * | 3/2012 | Chinn et al. | 95/130 |

OTHER PUBLICATIONS

Favre, E., "Carbon dioxide recovery from post-combustion processes: Can gas permeation membranes compete with absorption?", Journal of Membrane Science, 2007, 294, (1-2), 50-59.

Merkel, T. et al., "Power plant post-combustion carbon dioxide capture: An opportunity for Membranes", Journal of Membrane Science, 2010, 359, (1-2) 126-139.

Merkel, T. et al., "In Pilot Test of an Efficient Membrane Process for Post-combustion CO2 Capture", DOE NETL CO2 Capture Technology Meeting, Pittsburgh, PA, Aug. 22-26, 2011.

(Continued)

*Primary Examiner* — Jason M Greene
(74) *Attorney, Agent, or Firm* — Pauley Petersen & Erickson

(57) ABSTRACT

An apparatus for gas separation a composite gas separation membrane having a gas separation layer disposed on a surface of a porous support. The gas separation layer has a plurality of gas permeable inorganic nano-particles embedded in a dense polymer forming substantially only discrete gas transport channels through the dense polymer layer, wherein direct fluid communication is provided from a feed side of the composite gas separator membrane to the porous support. Preferably, the inorganic nano-particles are porous molecular sieve particles, such as SAPO-34, ALPO-18, and Zeolite Y nano-particles.

21 Claims, 2 Drawing Sheets

(56) References Cited

OTHER PUBLICATIONS

Noble, R.D., "Perspectives on mixed matrix membranes", Journal of Membrane Science, 2011, 378, (1-2), 393-397.
Dai, Y. et al., "ULTEM((R))/ZIF-8 mixed matrix hollow fiber membranes for CO2/N2 separators", Journal of Membrane Science, 2012, 401, 76-82.
Li, S.G. et al., "High-Flux SAPO-34 Membrane for CO2/N2 Separation", Industrial & Engineering Chemistry Research, 2010, 49, (9), 4399-4404.
Robeson, L.M., "The upper bound revisited", Journal of Membrane Science, 2008, 320, (1-2), 390-400.
Szostak, R., Molecular Sieves—Principles of Synthesis and Identification, Blackie Academic & Professional, 1998, 270-271.
Ohta, Y. et al., "A combinatorial dynamic Monte Carlo approach to finding a suitable zeolite membrane structure for CO2/N2 separation", Microporous and Mesoporous Materials, 2007, 101, (1-2), 319-323.
Chung, Tai-Shung et al., "Mixed matrix membranes (MMMs) comprising organic polymers with dispersed inorganic fillers for gas separation", Progress in Polymer Science, 32 (2007) 483-507.

* cited by examiner

NANO-CHANNEL ENHANCED COMPOSITE MEMBRANES

BACKGROUND OF THE INVENTION

1. Field of the Invention

This invention relates to a method and apparatus for separation of gaseous components in a gas mixture. In one aspect, this invention relates to membranes for gas separation. In another aspect, this invention relates to the separation of $CO_2$ from $CO_2$-containing gas mixtures such as power plant flue gas.

2. Description of Related Art

Amine gas treating refers to a group of processes that use aqueous solutions of alkylamines, also referred to simply as amines, to remove hydrogen sulfide ($H_2S$) and carbon dioxide ($CO_2$) from gaseous mixtures. A variety of amines are used for gas treating, the most common of which are monoethanolamine (MEA), diethanolamine (DEA), methyldiethanolamine (MDEA), diisopropylamine (DIPA), and diglycolamine (DGA). A typical amine gas treating process and system includes an absorber and a regenerator as well as accessory equipment. A gas stream containing $H_2S$ and/or $CO_2$ and an amine solution are introduced into the absorber, wherein the $H_2S$ and/or $CO_2$ is absorbed into the solution, producing a gas stream free of $H_2S$ and/or $CO_2$ and an amine solution rich in the absorbed acid gases. The acid gas rich amine solution is then introduced into a regenerator wherein the acid gases are separated, i.e. stripped, from the amine solution, producing an amine solution which can then be recycled for reuse in the absorber and stripped gases containing concentrated $H_2S$ and/or $CO_2$.

Amine absorption is currently the U.S. Department of Energy (DOE)/National Energy Technology Laboratory (NETL) and industry benchmark technology for the capture of $CO_2$ from power plant flue gas. Systems analysis studies have estimated that using chemical absorption with an aqueous monoethanolamine system to capture 90% of the $CO_2$ from flue gas will require an increase in the cost of energy services of about 75-85%. Such an increase in the cost of energy is well above the 2020 DOE/NETL Sequestration Program post-combustion capture goal of 90% capture in existing plants with less than a 35% increase in the cost of energy. Thus, it is important that new advanced $CO_2$ capture technologies be developed in order to maintain the cost-effectiveness of U.S. coal-fired power generation.

One such technology involves the use of membranes. Compared with amine absorption, membrane processes require less energy to operate and do not require chemicals or regenerating absorbents to maintain. In addition, membranes are compact and can be retrofitted onto the tail end of power-plant flue gas streams without complicated integration. Recent systems analysis and feasibility studies show that membranes are a technically feasible and economically viable option for $CO_2$ capture from the flue gas exhaust from coal-fired power generation. The two basic criteria for determining whether a membrane can be effectively utilized for flue gas applications are permeance and selectivity in the desired operating environment.

One recent study has shown that the optimal membrane $CO_2/N_2$ selectivity for separation of $CO_2$ from flue gas is in the range of about 20 to 40. Increasing selectivity further has almost no effect on the cost of $CO_2$ capture. Rather the critical factor for reducing $CO_2$ capture cost is increasing membrane permeance. For example, when $CO_2/N_2$ selectivity is greater than 30, an increase in $CO_2$ permeance from 1000 to 4000 gas permeation units (GPU) causes a decrease in $CO_2$ capture cost by nearly 50%.

Currently, the only commercially viable membranes for $CO_2$ removal are polymer based, such as polysiloxanes, cellulose acetate, polyimides, polyamides, polysulfone, polycarbonates, and polyetherimide. The most widely used and tested of these membrane materials is cellulose acetate. However, these commercially available polymer membranes for $CO_2$ removal typically have a permeance of only about 100 GPU, which is too low for flue gas $CO_2$ capture, and a $CO_2/N_2$ selectivity of about 30. Thus, there is a need for new membranes for flue gas $CO_2$ capture.

One such membrane is the POLARIS™ membrane of Membrane Technology and Research, Inc., which has a $CO_2$ permeance of about 2,000 GPU and a $CO_2/N_2$ selectivity of about 50. Another such membrane, currently under development, is a gelled ionic liquid membrane to achieve a $CO_2$ permeance of 10,000 GPU and a $CO_2/N_2$ selectivity of at least 20. Still another such membrane is a mixed matrix membrane having a $CO_2$ permeable layer comprising a continuous phase of polymeric material and inorganic particles uniformly dispersed throughout the continuous polymeric phase. Although such mixed matrix membranes have not been commercialized for gas separation, similar mixed matrix membranes have been commercialized for seawater desalination.

SUMMARY OF THE INVENTION

It is, thus, one object of this invention to provide a hybrid membrane for gas separation.

It is another object of this invention to provide a hybrid membrane having sufficient permeance and $CO_2$ selectivity for use with flue gas.

These and other objects of this invention are addressed by a gas separation structure having a feed side and an opposite permeate side comprising a porous support having a feed side facing surface covered by a dense polymer layer and a plurality of gas permeable molecular sieve nano-particles embedded in the dense polymer layer, whereby substantially all of the gas permeable molecular sieve nano-particles provide direct fluid communication between the feed side of the gas separation structure and the porous support. That is, the inorganic nano-particles are dispersed within the dense polymer layer so as to provide fluid communication substantially only directly from the feed side of the structure to the porous support, that is, without intervening contact with the dense polymer layer. This may be achieved in accordance with one embodiment of this invention by employing inorganic nano-particles having a particle size greater than the thickness of the dense polymer layer, thereby ensuring that the nano-particles are directly exposed to a gas feed stream on the feed side of the gas separation structure and are in direct contact with the porous support. In addition to providing discrete gas transport channels through the individual nano-particles, in accordance with one embodiment of this invention, the dense polymer layer is gas permeable and the nano-particles are further arranged so as to provide discrete gas transport channels in the dense polymer, providing fluid communication substantially only directly from the feed side of the structure to the porous support.

BRIEF DESCRIPTION OF THE DRAWINGS

These and other objects and features of this invention will be better understood from the following description in conjunction with the drawings, wherein.

DETAILED DESCRIPTION OF THE PRESENTLY PREFERRED EMBODIMENTS

Definitions

As used herein, the term "nano-particles" refers to particles having a particle size less than or equal to about 500 nanometers (nm).

As used herein, the term "feed side" refers to the side of the gas separation structure on which is disposed a gas mixture containing one or more components for separation therefrom and the "permeate side" refers to the side of the gas separation structure on which is disposed the separated gas component.

As used herein, the term "substantially" as used to describe the extent of nano-particles providing direct fluid communication between the feed side and the porous support of the gas separation structure means at least 80% of the nano-particles embedded in the dense polymer layer.

As used herein, the term "direct fluid communication" refers to fluid communication where there is no intervening element or structure between the fluid source and the element or structure identified as having the fluid communication.

In membrane processes, the following parameters are commonly used to describe membrane performance:

Permeance: pressure normalized flux (a measure of the rate at which gases pass through the membrane), typically defined in GPU (1 GPU=$10^{-6}$ $cm^3$(STP)/($cm^2$×s×cmHg)).

Permeability: permeance×membrane thickness, typically defined in Barrer (1 Barrer=$10^{-10}$ $cm^3$(STP)×cm/($cm^2$×s×cmHg)).

Selectivity: relative rates of permeation among gas components.

For $CO_2$ capture from flue gases, $CO_2$ permeance and $CO_2$/$N_2$ selectivity at the intended operating environment are the two basic criteria to determine whether a membrane can be effectively utilized.

Figure 1:
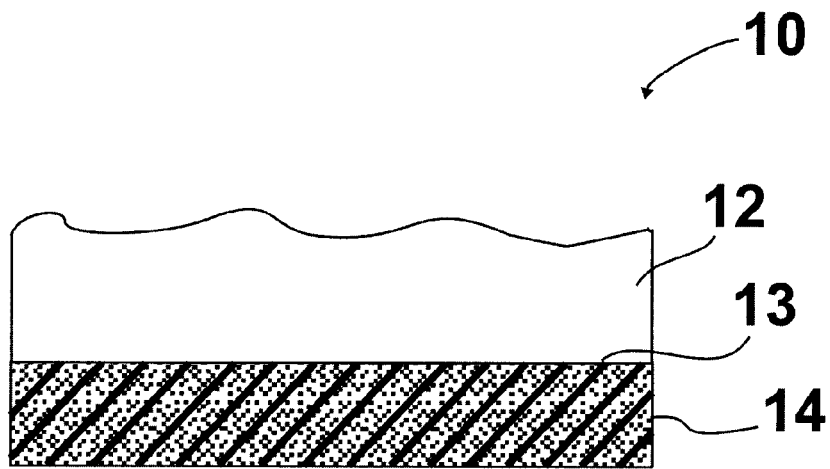
FIG. 1 is a diagrammatic representation of a conventional gas separation membrane.
Figure 2:
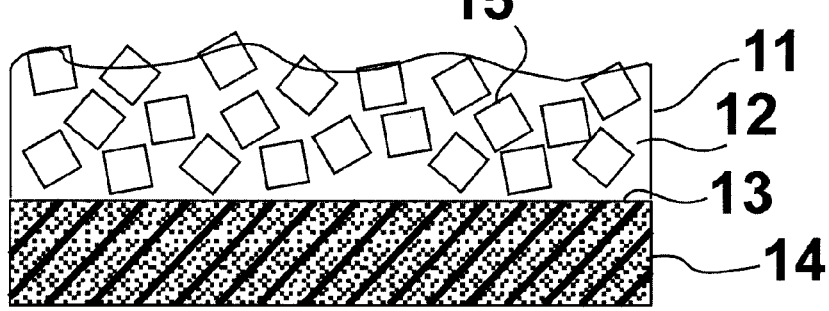
FIG. 2 is a diagrammatic representation of a conventional mixed matrix membrane.
Figure 3:
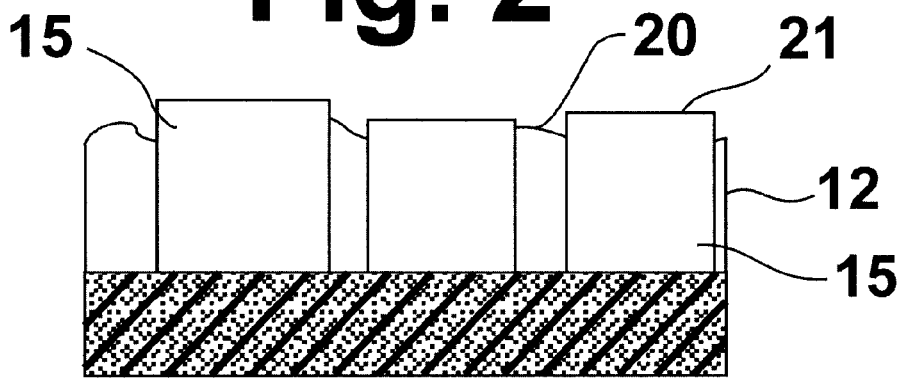
FIG. 3 is a diagrammatic representation of a hybrid membrane in accordance with one embodiment of this invention.

The invention described herein is a gas separation structure 10 comprising a hybrid membrane 11 having a dense polymer layer 12 covering the feed side facing surface 13 of a porous structure 14. As used herein, the term "dense" means non-porous; however, it will be appreciated by those skilled in the art that, due to manufacturing limitations, a dense material may have unintended incidental pores and such dense materials are deemed to be within the scope of this invention. Dispersed within the dense polymer layer 12 are a plurality of porous nano-particles 15. However, in contrast to conventional mixed matrix membranes as shown in FIG. 2, wherein the porous nano-particles are uniformly dispersed throughout the dense polymer layer, the porous nano-particles of this invention are distributed as shown in FIG. 3 to provide discrete gas transport channels 21 through the porous nano-particles. That is, the porous nano-particles are distributed so as to provide direct fluid communication through the dense polymer layer via the porous nano-particle channels 21 from the feed side of the membrane to the porous support structure 14. In contrast thereto, as shown in FIG. 2, such direct fluid communication, particularly through the uniformly dispersed nano-particles, is not possible in conventional matrix membranes because either at least a portion of the gaseous fluid entering the membrane will be blocked by the dense polymer layer is the dense polymer layer is gas impermeable or at least a portion of the gaseous fluid entering the membrane from the feed side of the membrane will pass through both a portion of the dense polymer layer, if the dense polymer layer is gas permeable, and the porous nano-particles before passing to the porous support structure, thereby reducing the performance of the membrane compared with the membrane of this invention. In accordance with one preferred embodiment of this invention, the dense polymer layer is gas permeable. As a result, distribution of the porous nano-particles as shown in FIG. 3 not only produces discrete gas transport channels 21 through the porous nano-particles, but also produces discrete gas transport channels 20 in the dense polymer layer 12.

As previously indicated, one object of this invention is to provide a gas separation structure suitable for separating $CO_2$ from a gaseous mixture, such as flue gas. Accordingly, in accordance with one embodiment of this invention, the porous inorganic nano-particles are selectively permeable for $CO_2$ and the dense polymer layer is gas impermeable. In accordance with another embodiment of this invention, the porous inorganic nano-particles are selectively permeable for $CO_2$ and the dense polymer layer is permeable for $CO_2$.

In accordance with one embodiment of this invention, the dense polymer layer comprises a polymer selected from the group consisting of polysiloxanes, cellulose acetate, polyimides, polyamides, polysulfone, polycarbonates, polyetherimides, and combinations thereof In accordance with one preferred embodiment of this invention, the dense polymer layer is a polyamide layer.

In accordance with one embodiment of this invention, the porous inorganic nano-particles are gas permeable molecular sieve nano-particles such as SAPO-34, ALPO-18, and Zeolite Y nano-particles. In accordance with one preferred embodiment, the gas permeable molecular sieve nano-particles are SAPO-34 nano-particles. SAPO-34 is a silicoaluminophosphate zeolite with 8-membered ring windows (~0.38 nm) having a chabazite structure. In order to ensure direct fluid communication between the feed side of the gas separation structure and the porous inorganic nano-particles and the porous support, the size of the inorganic nano-particles must be greater than the thickness of the dense polymer layer. Accordingly, for a structure employing SAPO-34 zeolite nano-particles having a particle size of about 100 nm, the thickness of the dense polymer layer should be less than 100 nm.

Suitable porous support structures are known in the art. In accordance with one embodiment of this invention, the porous support structure comprises a polymer selected from the group consisting of polysiloxanes, cellulose acetate, polyimides, polyamides, polysulfones, polycarbonates, polyetherimides, and combinations thereof. In accordance with one preferred embodiment of this invention, the porous support structure is a polysulfone structure.

In accordance with one preferred embodiment of this invention, the gas separation structure comprises a dense polyamide layer having a thickness in the range of about 100 nm to about 200 nm disposed on a porous support and a plurality of SAPO-34 nano-particles having a particle size slightly larger than the thickness of the polyamide layer embedded within the polyamide layer and spaced apart so as to provide discrete gas transport channels through the polyamide layer and the SAPO-34 nano-particles. Previously, membranes of SAPO-34 particles having a thickness of about 5 μm on alumina supports have shown $CO_2$ permeances of 3500-4500 GPU and $CO_2/N_2$ separation selectivities of 21-32 at 22° C. However, one disadvantage of pure SAPO-34 membranes that may prevent their commercial application for $CO_2$ capture is the high cost. The membrane of this invention can improve separation performance while still maintaining the advantages of polymeric membranes, such as low cost, uncomplicated fabrication processes and high packing density. Assuming a 100 nm thick nano-channel enhanced composite membrane having a composition of 10% SAPO-34/90% polyamide, the $CO_2$ permeance may be as high as 20,000 GPU.

Fabrication of a membrane in accordance with one embodiment of this invention comprises the basic steps described in more detail herein below.

Synthesizing of Uniform, Nano-Sized SAPO-34 Crystals

The synthesis of zeolite nano-crystals requires conditions that favor nucleation over crystal growth in the initial stages of the process. Crystal growth inhibitors (CGIs), for example, polyethylene glycol and methylene blue, may be used to interact with reactive sites of the inorganic precursors in solution, thereby shortening the nucleation period and producing a larger number of smaller nuclei. At this stage, the CGI adsorbs onto the surfaces of these nuclei, thereby inhibiting the growth of the crystals. The adsorbed CGI is then decomposed at high temperature during later stages of the hydrothermal treatment. Thus, a larger population of small nuclei after the induction period leads to the formation of smaller crystals. This mechanism may be used to prepare SAPO-34 crystals displaying ~100 nm narrow size distribution crystals.

Functionalizing the Surface of SAPO-34 Crystals with Amino or Organosilanes Groups Functionalizing the surface of SAPO-34 crystals with amino or organosilanes is required to generate ideal nanoparticle-polymer interfaces during the membrane formation process discussed herein below. Ethylenediamine (ED) is particularly suitable for functionalization because it has two side amino groups which, it is believed, first adsorb at the Bronsted acid bridging OH groups of the SAPO-34 crystal surface, which is rich with unsaturated —OH groups, thereby coordinating the tetrahedral metal atoms of the SAPO-34 framework. The other amino group of ED may be available to coordinate with the polymer and the amino groups or —OH groups may be available for preferential $CO_2$ adsorption.

Figure 4:
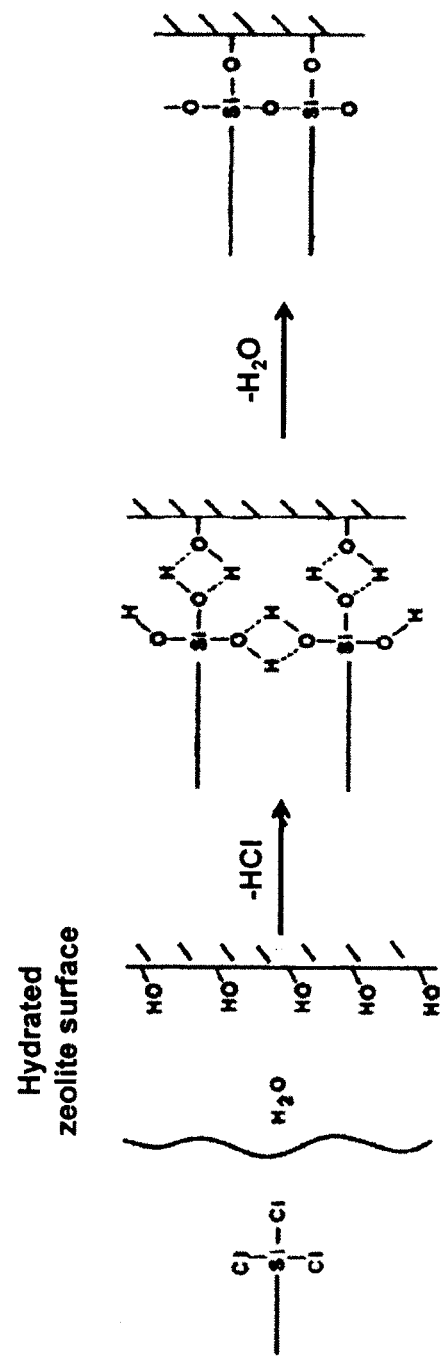
FIG. 4 is a diagram showing functionalization of a zeolite surface by organosilane groups using trichlorosilanes.

Alternatively, the surface of the SAPO-34 crystals may be silanated by grafting long aliphatic chains onto the crystal surface using a trichlorosilane group. As shown in FIG. 4, the trichlorosilane molecules react with OH-groups on the surface of the SAPO-34 crystals, followed by HCl and water eliminations, resulting in a chemically anchored monolayer on the surface of SAPO-34 crystals. Silanation changes the surface property of the SAPO-34 crystals from hydrophilic to hydrophobic.

Fabricating Membranes by Delayed Interfacial Polymerization

Polyamide membranes, well known for their use in reverse osmosis sea water desalination, are prepared by interfacial polymerization, which is an effective way to control the separation layer thickness at around 100 to 500 nm. Fabrication of the membrane in accordance with one embodiment of this invention requires good adhesion between the SAPO-34 particles and polyamide, and control of the membrane thickness. Good adhesion reduces the chances that defects, including interface voids, rigidified polymer layer around the particles, and particle pore blockage, will occur.

EXAMPLE 1

In this example, the surface of the SAPO-34 crystals was functionalized with amino groups to improve their compatibility with polyamide at the interface in the subsequent polymerization processes. The functionalized SAPO-34 nanocrystals were then dispersed in hexane by ultra-sonication to break up SAPO-34 crystal aggregates and facilitate embedding of the SAPO-34 crystals in polyamide. This may be achieved with increased sonication time and higher power using a sonic probe. During the ultra-sonication process, an aqueous solution of m-phenylenediamine (MPD) was poured onto a polysulfone porous support to wet the surface for about 2 minutes, following which the excess liquid was removed by air-blowing to leave a very thin water film (<100 nm) on the polysulfone surface. The hexane solution with well-dispersed, functionalized SAPO-34 nanocrystals was slowly added and spread on the water film on the polysulfone support resulting in the surface of polysulfone being hydrophobic.

Functionalized SAPO-34 crystals with amino groups are hydrophilic and, thus, may move from the organic phase to the aqueous phase. In addition, gravity may drag the SAPO-34 crystals to the bottom water phase. As a result, cubic SAPO-34 crystals sit on the polysulfone surface and in the water phase. Because the sizes of the SAPO-34 crystals are larger than the water film thickness, the tops of the crystals are in the organic phase and not covered by the water phase. After partially immersing the SAPO-34 crystals in the water film, hexane with trimesoyl chloride (TMC) was added on the pre-spread hexane film, as a result of which the TMC diffused in the hexane phase, reaching the interface to polymerize with MPD to form polyamide. Because polymerization occurs mainly at the interface, the tops of the SAPO-34 crystals in the hexane phase and bottoms of the SAPO-34 crystals in the water phase are not covered by polyamide. After cleaning with water and then drying, the membrane structure was obtained.

EXAMPLE 2

In this example, a similar method was employed for hydrophilic porous supports, such as Nylon-6 or Nylon-11. Organosilanes were grafted onto the surfaces of the SAPO-34 crystals using trichlorosilanes to make the crystals hydrophobic. The pores of the functionalized SAPO-34 crystals with organosilanes are not blocked by surface organosilanes groups. The functionalized crystals were then well dispersed in water using ultra-sonication with a sonic probe for later use in interfacial polymerization.

Although surface organosilane groups do not chemically bond with polyamide, organic tails have good compatibility with polyamide due to their organic feature and, thus, minimize defects at the interface between the crystals and the polyamide.

Etching to Remove any Trace Polymer Coating Covering the Top of the Nanocrystals After Interfacial Polymerization As indicated herein above, functionalized SAPO-34 crystals with amino groups on the surface participate in the polymerization process and enhance the compatibility of the crystals with the polyamide, thereby reducing potential defects. However, amino groups on the top surface of the SAPO-34 crystals in the hexane phase may react with TMC, resulting in the formation of trace amounts of polyamide on the surfaces of the SAPO-34 crystals, which may generate some transport resistance for $CO_2$. Organosilane groups on the crystal surface may also generate some transport resistance for $CO_2$ due to long alkane tails. However, the trace amount of polyamide or organosilane groups on the top surface of SAPO-34 crystals may be removed by short term plasma oxidation to enhance $CO_2$ permeance.

As previously indicated, conventional mixed matrix membranes for gas separation employ inorganic particles dispersed within the polymer layer. Thus, during gas separation, molecules must transport alternately in the polymer and inorganic phases, limiting the capability of performance improvement derived from the addition of the inorganic particles. In contrast thereto, the nano-channel enhanced membrane structure of this invention provides open channels of molecular sieve nano-particles embedded in a dense skin layer of polymer which are directly exposed to the feed gas molecules whereby the feed gas molecules are able to transport independently through the molecular sieve nano-particles and the polymer phase, significantly improving the membrane performance. For example, conventional SAPO-34 membranes typically have a $CO_2$ permeability of 20,000 Barrers. Thus, a defect-free and 100% coverage of a monolayer of 100 nm SAPO-34 crystals would have a $CO_2$ permeance of 200,000 GPU. For nano-channel enhanced membranes with 10% coverage of SAPO-34 nano-particles in polyamide ($CO_2$ permeance: <20 GPU, and $CO_2/N_2$ selectivity: 15-28) in accordance with one embodiment of this invention, the $CO_2$ permeance may be as high as 20,000 GPU (=200,000×10%+ 20×90%), which is about 200 times higher than the conventional cellulose acetate membranes (100 GPU). The majority of the gas permeation is through the SAPO-34 crystals, and thus the overall $CO_2/N_2$ selectivity through the nano-channel enhanced membrane may be identical to a defect-free pure SAPO-34 membrane. Since a $CO_2/N_2$ selectivity of 32 for a pure SAPO-34 membrane has been reported and this membrane may still have defects, a high quality nano-channel enhanced membrane should have a selectivity of at least 32.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A gas separation structure having a feed side and an opposite permeate side, said gas separation structure comprising:
    a porous support having a feed side facing surface covered by a dense polymer layer;
    a plurality of gas permeable molecular sieve nano-particles embedded in said dense polymer layer to form a monolayer of said gas permeable molecular sieve nano-particles, wherein said gas permeable molecular sieve nano-particles have a generally uniform particle size greater than a thickness of said dense polymer layer and substantially all of said gas permeable molecular sieve nano-particles provide direct fluid communication between said feed side and said porous support without intervening contact with the dense polymer layer; and
    wherein the dense polymer layer provides a discrete transport channel between the gas permeable molecular sieve nano-particles.

2. The gas separation structure of claim 1, wherein said dense polymer layer is gas permeable.

3. The gas separation structure of claim 2, wherein said dense polymer layer is permeable for $CO_2$.

4. The gas separation structure of claim 1, wherein said gas permeable molecular sieve nano-particles are selectively permeable for $CO_2$.

5. The gas separation structure of claim 1, wherein said gas permeable molecular sieve nano-particles are selected from the group consisting of SAPO-34, ALPO-18, and Zeolite Y nano-particles and combinations thereof.

6. The gas separation structure of claim 1, wherein said dense polymer layer comprises a polymer selected from the group consisting of polysiloxanes, cellulose acetate, polyimides, polyamides, polysulfones, polycarbonates, polyetherimides, and combinations thereof.

7. The gas separation structure of claim 1, wherein said porous support comprises a polymer selected from the group consisting of polysiloxanes, cellulose acetate, polyimides, polyamides, polysulfones, polycarbonates, polyetherimides, and combinations thereof.

8. The gas separation structure of claim 7, wherein said porous support is a polysulfone structure.

9. A composite gas separation membrane having a feed side and a permeate side comprising:
    a porous support having a feed side facing surface;
    a dense polymer layer disposed on said feed side of facing surface;
    a plurality of spaced apart gas permeable inorganic nano-particles embedded in said dense polymer layer to form a monolayer of said gas permeable inorganic nano-particles providing separate gas transport channels through said dense polymer layer, wherein said gas permeable inorganic nano-particles have a generally uniform particle size greater than a thickness of said dense polymer layer to provide direct fluid communication from said feed side to said porous support without intervening contact with the dense polymer layer; and
    wherein the dense polymer layer provides a discrete transport channel between the gas permeable molecular sieve nano-particles.

10. The composite gas separation membrane of claim 9, wherein said dense polymer layer comprises a polymer selected from the group consisting of polysiloxanes, cellulose acetate, polyimides, polyamides, polysulfones, polycarbonates, polyetherimides, and combinations thereof.

11. The composite gas separation membrane of claim 9, wherein said gas permeable inorganic nano-particles are molecular sieve nano-particles.

12. The composite gas separation membrane of claim 11, wherein said molecular sieve nano-particles are selected from the group consisting of SAPO-34, ALPO-18, and Zeolite Y nano-particles and combinations thereof.

13. The composite gas separation membrane of claim 9, wherein said dense polymer layer is permeable for $CO_2$ and said gas permeable inorganic nano-particles are selectively permeable for $CO_2$.

14. The composite gas separation membrane of claim 9, wherein said porous support comprises a polymer selected from the group consisting of polysiloxanes, cellulose acetate, polyimides, polyamides, polysulfones, polycarbonates, polyetherimides, and combinations thereof.

15. The composite gas separation membrane of claim 14, wherein said porous support is a polysulfone structure.

16. An apparatus for gas separation comprising:

a composite gas separation membrane having a gas separation layer disposed on a surface of a porous support, said gas separation layer comprising a plurality of gas permeable inorganic nano-particles embedded in a dense polymer layer as a monolayer forming substantially only discrete gas transport channels through said dense polymer layer via said gas permeable inorganic nano-particles wherein said gas permeable inorganic nano-particles have a generally uniform particle size greater than a thickness of said dense polymer layer to provide direct fluid communication from a feed side of said composite gas separator membrane to said porous support without intervening contact with the dense polymer layer, and wherein the dense polymer layer is gas permeable to provide a discrete transport channel between the gas permeable molecular sieve nano-particles.

17. The gas separation apparatus of claim 16, wherein said porous support comprises a polymer selected from the group consisting of polysiloxanes, cellulose acetate, polyimides, polyamides, polysulfones, polycarbonates, polyetherimides, and combinations thereof.

18. The gas separation apparatus of claim 17, wherein said porous support is a polysulfone structure.

19. The gas separation apparatus of claim 16, wherein said dense polymer layer comprises a polymer selected from the group consisting of polysiloxanes, cellulose acetate, polyimides, polyamides, polysulfones, polycarbonates, polyetherimides, and combinations thereof.

20. The gas separation apparatus of claim 16, wherein said gas permeable inorganic nano-particles are selected from the group consisting of SAPO-34, ALPO-18, and Zeolite Y nano-particles and combinations thereof.

21. The gas separation apparatus of claim 16, wherein said gas permeable inorganic nano-particles are selectively permeable for $CO_2$.

\* \* \* \* \*

UNITED STATES PATENT AND TRADEMARK OFFICE
CERTIFICATE OF CORRECTION

PATENT NO. : 9,005,345 B2  
APPLICATION NO. : 13/622434  
DATED : April 14, 2015  
INVENTOR(S) : Shiguang Li et al.

Page 1 of 1

It is certified that error appears in the above-identified patent and that said Letters Patent is hereby corrected as shown below:

On the title page, item (73), delete "(73) Assignee: Gas Technology Limited" and insert
--(73) Assignee: Gas Technology Institute--

Signed and Sealed this  
Twenty-third Day of June, 2015

Michelle K. Lee  
*Director of the United States Patent and Trademark Office*